US012415198B2

(12) United States Patent
Hang et al.

(10) Patent No.: US 12,415,198 B2
(45) Date of Patent: Sep. 16, 2025

(54) SHORT AND SMALL EXTERNAL DUAL-SPRING SPRAYER

(71) Applicant: NINGBO JINYU TECHNOLOGY INDUSTRY CO., LTD., Ningbo (CN)

(72) Inventors: Cheng Hang, Ningbo (CN); Xianqiang Zhu, Ningbo (CN)

(73) Assignee: NINGBO JINYU TECHNOLOGY INDUSTRY CO., LTD., Ningbo (CN)

( * ) Notice: Subject to any disclaimer, the term of this patent is extended or adjusted under 35 U.S.C. 154(b) by 122 days.

(21) Appl. No.: 18/244,324

(22) Filed: Sep. 11, 2023

(65) Prior Publication Data

US 2025/0058339 A1 Feb. 20, 2025

Related U.S. Application Data

(63) Continuation of application No. PCT/CN2023/113043, filed on Aug. 15, 2023.

(51) Int. Cl.
*B05B 11/10* (2023.01)

(52) U.S. Cl.
CPC ...... *B05B 11/1074* (2023.01); *B05B 11/1069* (2023.01); *B05B 11/1073* (2023.01)

(58) Field of Classification Search
CPC ............ B05B 11/1074; B05B 11/1069; B05B 11/1067; B05B 11/1073
USPC ............ 222/321.7, 321.8, 321.9, 320, 321.1, 222/321.2, 321.6; 239/329, 331, 333
See application file for complete search history.

(56) References Cited

U.S. PATENT DOCUMENTS 7,281,644 B2 * 10/2007 Cater .................. B05B 11/1025 222/321.2
10,512,926 B2 * 12/2019 Goettke ............. B05B 11/1074

* cited by examiner

*Primary Examiner* — David J Walczak
(74) *Attorney, Agent, or Firm* — Jose Cherson Weissbrot

(57) ABSTRACT

A short and small external dual-spring sprayer, including a head cap cover, where a head cap is arranged in the head cap cover, a spray piece is arranged at a front end of the head cap, the head cap is connected to a valve rod, the valve rod is sleeved at an upper part of a valve needle, the valve needle penetrates through a bushing and a piston and is further sleeved with an internal spring, the internal spring has an upper part located in the valve rod and a lower end in contact with the piston, an external spring is arranged on an outer side of the internal spring and has an upper part located in a middle sleeve and a lower part located in the bushing.

10 Claims, 9 Drawing Sheets

SHORT AND SMALL EXTERNAL DUAL-SPRING SPRAYER

CROSS-REFERENCE TO RELATED APPLICATIONS

The present application is a continuation of International Application No. PCT/CN2023/113043, with an international filing date of Aug. 15, 2023, the entire contents of all of which are incorporated herein by reference.

FIELD OF TECHNOLOGY

The present invention relates to the technical field of spray pumps, in particular to a short and small external dual-spring sprayer.

BACKGROUND

The pump, a machine configured to increase the pressure of liquid or gas and make it conveyed and flow, is an apparatus configured to move liquid, gas, or a special fluid medium, that is, a machine that does work on a fluid. Pumps are mainly configured to transport liquids including water, oil, acid and alkali liquids, emulsions, suspended emulsions, and liquid metals, and can also transport liquids, gas mixtures, and liquids containing suspended solids.

At present, metal springs are used in most of spray pumps for daily chemical products and/or cleaning products and cosmetic products sold in the market. However, the metal springs are prone to being in contact with contents to cause adverse chemical reactions, resulting in pollution of the contents.

SUMMARY

To solve the above technical problems, the present invention provides a short and small external dual-spring sprayer, including a head cap cover, where a head cap is arranged in the head cap cover, a spray piece is arranged at a front end of the head cap, the head cap is connected to a valve rod, the valve rod is sleeved at an upper part of a valve needle, the valve needle penetrates through a bushing and a piston and is further sleeved with an internal spring, the internal spring has an upper part located in the valve rod and a lower end in contact with the piston, an external spring is arranged on an outer side of the internal spring and has an upper part located in a middle sleeve and a lower part located in the bushing, the middle sleeve is sleeved on an outer side of the bushing and connected to an air cylinder, a gasket is arranged inside the middle sleeve and sleeved on an outer side of the air cylinder, a bottom of the air cylinder is connected to a suction tube, and a steel ball is arranged inside the air cylinder.

Preferably, a sleeving hole is formed inside the head cap, and an annular clamping groove is formed in an inner wall of the sleeving hole.

Preferably, the valve rod includes a fixing portion at an upper part and a support portion at a lower part, an outer diameter of the fixing portion is less than an outer diameter of the support portion, a convex rib is arranged on an outer wall of the fixing portion, a clamping sleeve is arranged inside the fixing portion, an annular external spring upper accommodating groove is formed inside the support portion, and an internal spring upper support region is arranged at a position, located on an inner side of the external spring upper accommodating groove, of the valve rod.

Preferably, a bulge portion is arranged at an upper part of the bushing, a first convex ring and a second convex ring are arranged in a middle of the bushing, an insertion portion is arranged at a bottom of the bushing, and an external spring lower accommodating groove is formed in an inner wall of the bushing.

Preferably, the middle sleeve includes an upper sleeve and a lower sleeve, a first sealing groove is formed in a top wall of the upper sleeve, a support bulge is further arranged in the upper sleeve, and a second sealing groove is formed in a top wall of the lower sleeve and configured to mount the gasket.

Preferably, a middle sleeve bulge arranged annularly is arranged on an inner wall of a bottom of the lower sleeve, and a plurality of grooves are further formed in the bottom of the lower sleeve.

Preferably, an internal spring lower support region is arranged at an upper end of the piston, an annular upper groove is formed in the upper end of the piston, a lower groove is formed in a lower end of the piston, a bevel edge is arranged on an inner wall of the lower groove, the piston is mounted inside the air cylinder, and the piston and the air cylinder form a cavity structure for accommodating a liquid.

Preferably, the valve needle includes a needle body and a sealing ring, an upper end surface of the sealing ring is an inclined surface, a liquid outlet is formed inside the needle body, a liquid inlet is formed in a bottom of the needle body, and an annular groove is formed in an outer wall of an upper part of the needle body.

Preferably, an air pressure balance hole is formed in an outer wall of the air cylinder, a tube connector is arranged at the bottom of the air cylinder, an accommodating cavity is formed in a position, located above the tube connector, of the air cylinder and configured to place the steel ball, and a plurality of inclined ribs are annularly arranged at an upper part of the accommodating cavity.

Preferably, a second external convex rib is arranged on an outer wall of an upper part of the air cylinder, a first external convex rib is arranged at a position, located below the second external convex rib, of the outer wall of the upper part of the air cylinder, and an inner groove is further formed inside the upper part of the air cylinder and configured to be clamped with the second convex ring.

The present invention has the following technical effects and advantages:

1. In the present invention, the internal spring upper support region is arranged at the position, located on the inner side of the external spring upper accommodating groove, of the valve rod, and when mounted, the valve rod is inserted into the bushing, thereby avoiding the inclination of the valve rod.

2. In the present invention, the first convex ring is arranged in the middle of the bushing, an outer diameter of the first convex ring is greater than an outer diameter of the bugle portion, and the first convex ring is attached to a top surface of the middle sleeve, to improve the sealing property.

3. In the present invention, the needle body is connected to the valve rod, and an inclination angle of the inclined surface of the sealing ring is the same as that of the bevel edge, such that the sealing ring can be tightly attached to the bevel edge, thereby achieving the sealing effect.

4. In the present invention, the plurality of inclined ribs are annularly arranged at the upper part of the accommodating cavity, thereby preventing the steel ball from falling off from the accommodating cavity.

5. In the sprayer, a short and small dual-spring structure is designed for attractive appearance of a product, and a metal spring is placed outside the valve needle, thereby avoiding adverse chemical reactions caused by contact between contents and the metal spring.

Figure 1:
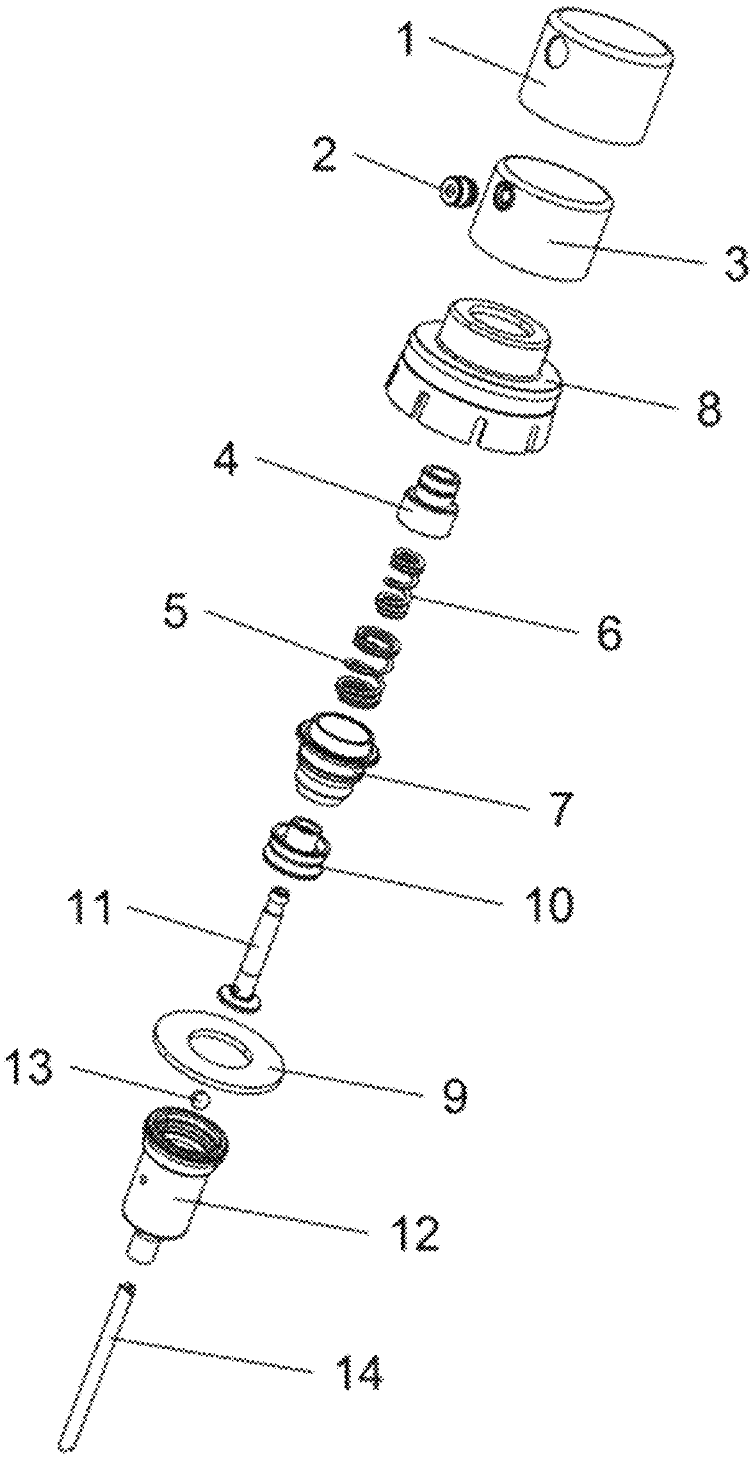
FIG. 1 is an exploded view of a short and small external dual-spring sprayer provided by an embodiment of the present application.

In the drawings: 1. head cap cover; 2. spray piece; 3. head cap; 31. sleeving hole; 32. clamping groove; 4. valve rod; 41. fixing portion; 42. support portion; 43. convex rib; 44. clamping sleeve; 45. external spring upper accommodating groove; 46. internal spring upper support region; 5. external spring; 6. internal spring; 7. bushing; 71. bulge portion; 72. first convex ring; 73. insertion portion; 74. second convex ring; 75. external spring lower accommodating groove; 8. middle sleeve; 81. upper sleeve; 82. lower sleeve; 83. first sealing groove; 84. support bulge; 85. second sealing groove; 86. middle sleeve bulge; 87. groove; 9. gasket; 10. piston; 101. upper groove; 102. internal spring lower support region; 103. lower groove; 104. bevel edge; 11. valve needle; 111. needle body; 112. sealing ring; 113. liquid outlet; 114. liquid inlet; 115. annular groove; 12. air cylinder; 121. air pressure balance hole; 122. tube connector; 123. first external convex rib; 124. inner groove; 125. accommodating cavity; 126. inclined rib; 127. second external convex rib; 13. steel ball; and 14. suction tube.

DESCRIPTION OF THE EMBODIMENTS

The present invention is further described in detail below in conjunction with the accompanying drawings and the specific embodiments. The embodiments of the present invention are provided for examples and description, and are not exhaustive or limit the present invention to the disclosed form. Many modifications and variations are obvious to those of ordinary skill in the art. The embodiments are selected and described to better illustrate the principles and practical applications of the present invention, and to enable those of ordinary skill in the art to understand the present invention and thus design various embodiments with various modifications suitable for specific purposes.

Figure 2:
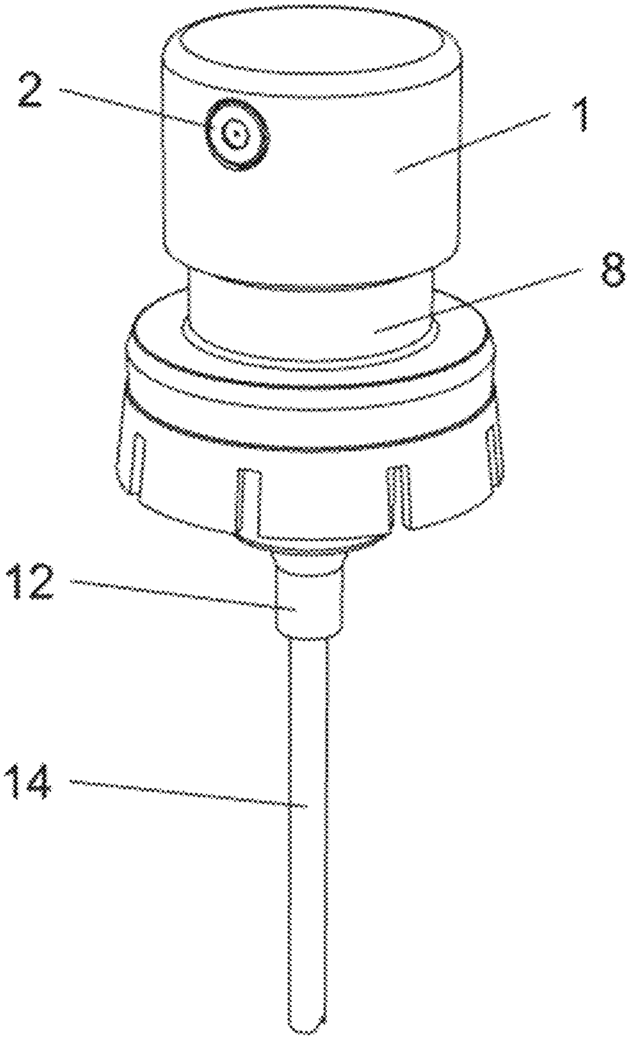
FIG. 2 is a schematic structural diagram of a short and small external dual-spring sprayer provided by an embodiment of the present application.
Figure 3:
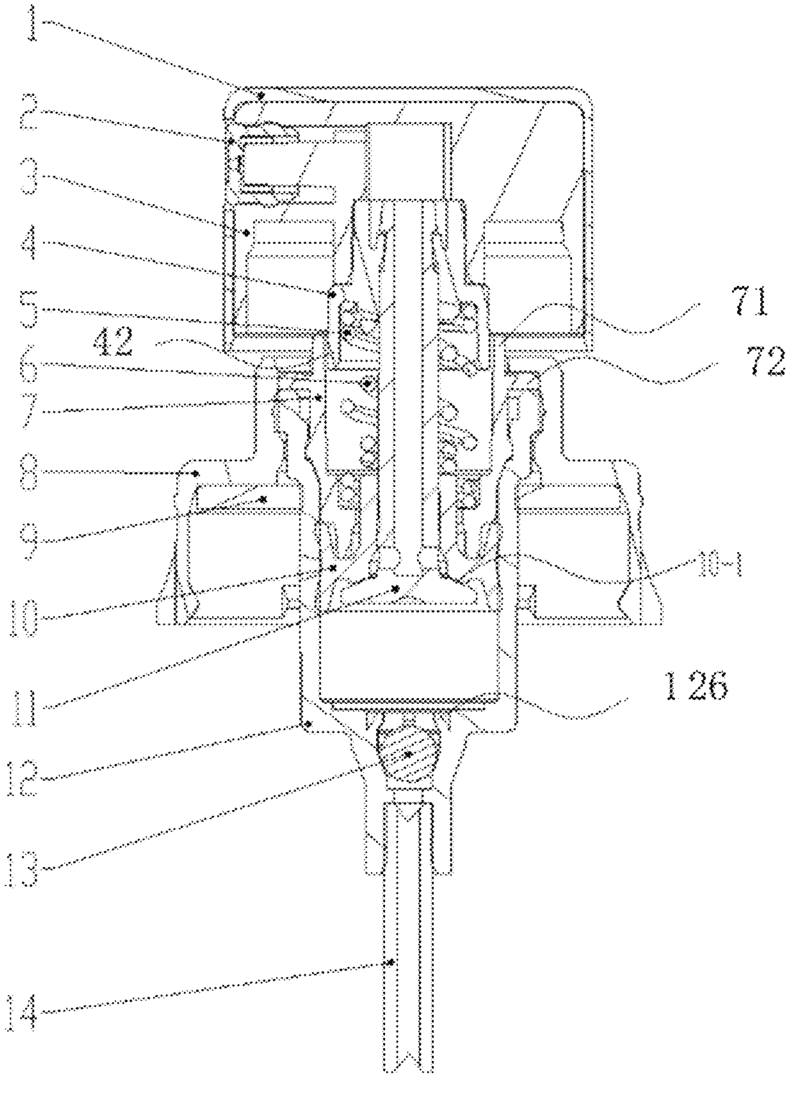
FIG. 3 is a sectional view of a short and small external dual-spring sprayer provided by an embodiment of the present application.

As shown in FIGS. 1-3, a short and small external dual-spring sprayer is provided in this embodiment, including a head cap cover 1, where a head cap 3 is arranged in the head cap cover 1, a spray piece 2 is arranged at a front end of the head cap 3 and configured to spray a liquid, the head cap cover 1 is provided with a through hole corresponding to the spray piece 2, the head cap 3 is connected to a valve rod 4, the valve rod 4 is sleeved at an upper part of a valve needle 11, the valve needle 11 penetrates through a bushing 7 and a piston 10 and is further sleeved with an internal spring 6, the internal spring 6 has an upper part located in the valve rod 4 and a lower end in contact with the piston 10, an external spring 5 is arranged on an outer side of the internal spring 6 and has an upper part located in a middle sleeve 8 and a lower part located in the bushing 7, the middle sleeve 8 is sleeved on an outer side of the bushing 7 and connected to an air cylinder 12, a gasket 9 is arranged inside the middle sleeve 8 and sleeved on an outer side of the air cylinder 12, a sealing effect is achieved when the middle sleeve 8 is connected to a bottle body through the arrangement of the gasket 9, a bottom of the air cylinder 12 is connected to a suction tube 14, and a steel ball 13 is arranged inside the air cylinder 12. In the sprayer, a dual-spring structure is arranged, and a metal spring is placed outside the valve needle 11, thereby avoiding adverse chemical reactions caused by contact between contents and the metal spring.

Figure 4:
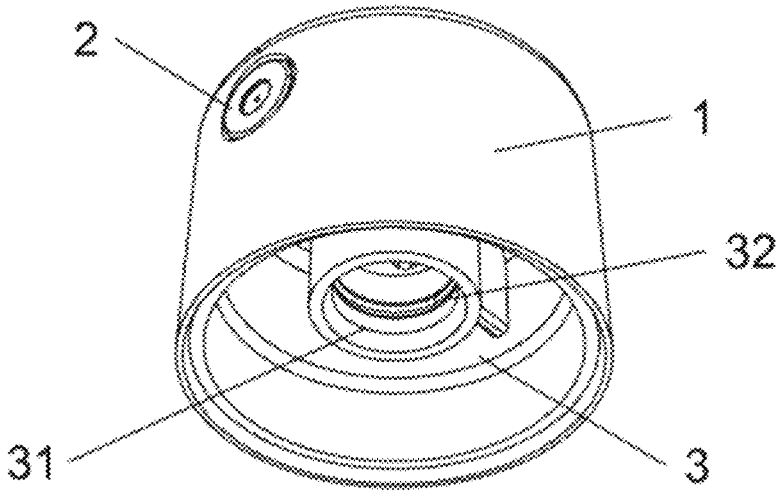
FIG. 4 is a schematic structural diagram of a head cap in a short and small external dual-spring sprayer provided by an embodiment of the present application.

Further, in this embodiment, as shown in FIG. 4, a sleeving hole 31 is formed inside the head cap 3, an annular clamping groove 32 is formed in an inner wall of the sleeving hole 31, the sleeving hole 31 communicates with the spray piece 2 and is configured to be inserted with the valve rod 4, and the clamping groove 32 is clamped with the valve rod 4 in a matched manner to connect the valve rod 4 to the sleeving hole 31.

Figure 5:
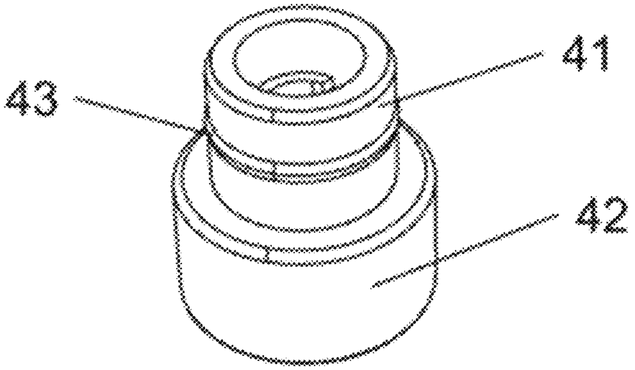
FIG. 5 is a schematic structural diagram of a valve rod in a short and small external dual-spring sprayer provided by an embodiment of the present application.
Figure 6:
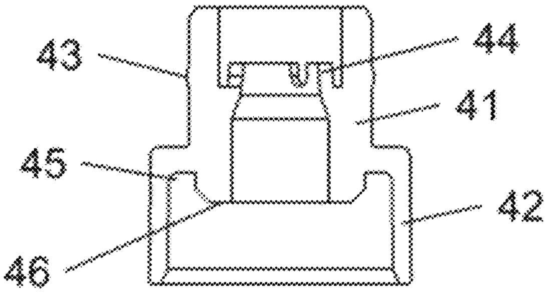
FIG. 6 is a sectional view of a valve rod in a short and small external dual-spring sprayer provided by an embodiment of the present application.

Further, in this embodiment, as shown in FIGS. 5-6, the valve rod 4 is hollow and includes a fixing portion 41 at an upper part and a support portion 42 at a lower part, an outer diameter of the fixing portion 41 is less than an outer diameter of the support portion 42, a convex rib 43 is arranged on an outer wall of the fixing portion 41 and is embedded into the clamping groove 32 to fix the valve rod 4 and the sleeving hole 31 when the valve rod 4 is inserted into the sleeving hole 31, a clamping sleeve 44 is arranged inside the fixing portion 41, the valve needle 11 penetrates through the clamping sleeve 44 from the bottom up along the valve rod 4, the valve needle 11 and the valve rod 4 are fixed by the clamping sleeve 44, an annular external spring upper accommodating groove 45 is formed inside the support portion 42, an upper part of the external spring 5 is embedded into the external spring upper accommodating groove 45, an internal spring upper support region 46 is arranged at a position, located on an inner side of the external spring upper accommodating groove 45, of the valve rod 4, and when mounted, the valve rod 4 is inserted into the bushing 7, thereby avoiding the inclination of the valve rod 4.

Figure 7:
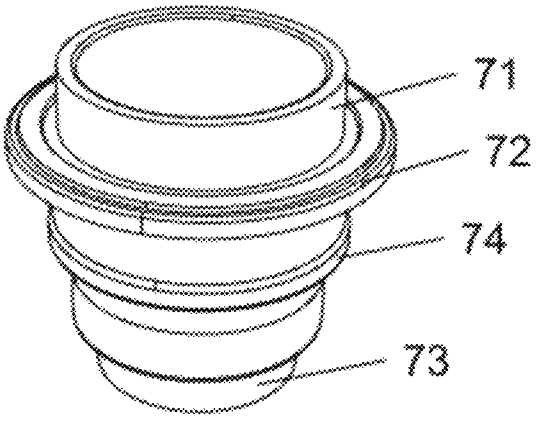
FIG. 7 is a schematic structural diagram of a bushing in a short and small external dual-spring sprayer provided by an embodiment of the present application.
Figure 8:
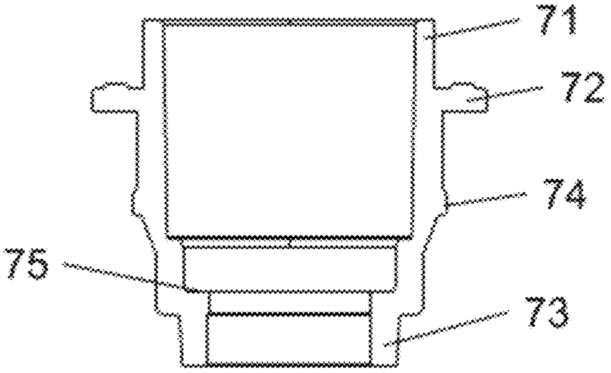
FIG. 8 is a sectional view of a bushing in a short and small external dual-spring sprayer provided by an embodiment of the present application.

Further, in this embodiment, as shown in FIGS. 7-8, the bushing 7 is hollow, a bulge portion 71 is arranged at an upper part of the bushing 7, an outer wall of the bulge portion 71 is a smooth surface, the bulge portion 71 penetrates through the middle sleeve 8 from the bottom up, and an upper end surface of the bulge portion 71 is higher than the middle sleeve 8, such that when the head cap 3 is pressed, the valve rod 4 is kept vertical; a first convex ring 72 is arranged in a middle of the bushing 7, an outer diameter of the first convex ring 72 is greater than an outer diameter of the bulge portion 71, and the first convex ring 72 is attached to a top surface of the middle sleeve 8, to improve the sealing property; an insertion portion 73 is arranged at a bottom of the bushing 7, an outer diameter of the insertion portion 73 is less than the outer diameter of the bulge portion 71, and the insertion portion 73 is configured to be inserted into the piston 10; a second convex ring 74 is further arranged in the middle of the bushing 7, and an outer diameter of the second convex ring 74 is less than the outer diameter of the first convex ring 72; the bushing 7 is inserted into the air cylinder 12, and the second convex ring 74 is in contact with an interior of the air cylinder 12 to achieve the sealing effect; and an external spring lower accommodating groove 75 is formed in an inner wall of the bushing 7, and a bottom of the external spring 5 is located in the external spring lower accommodating groove 75 to support the external spring 5.

Figure 9:
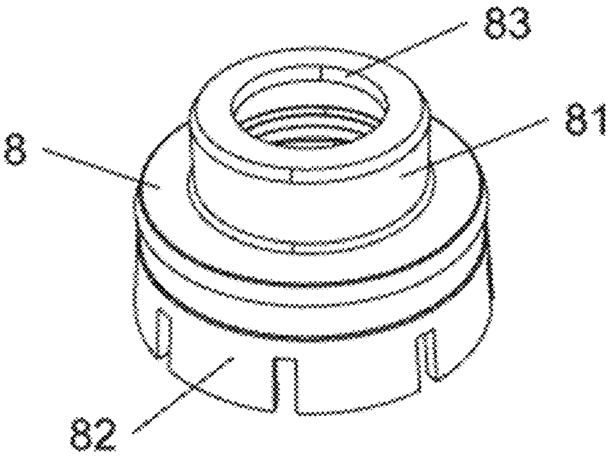
FIG. 9 is a schematic structural diagram of a middle sleeve in a short and small external dual-spring sprayer provided by an embodiment of the present application.
Figure 10:
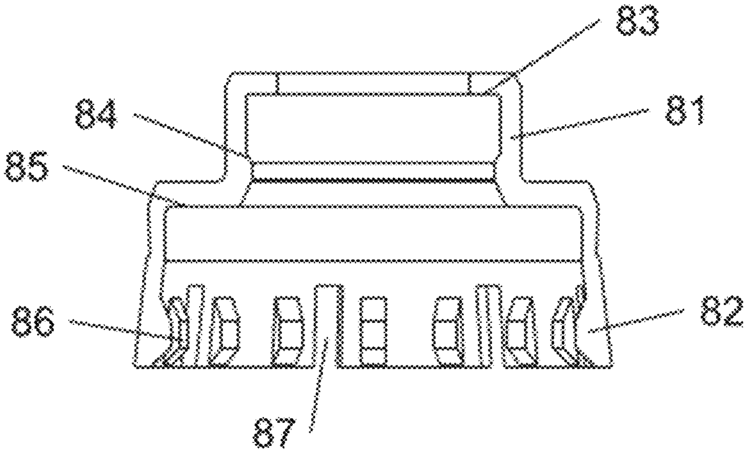
FIG. 10 is a sectional view of a middle sleeve in a short and small external dual-spring sprayer provided by an embodiment of the present application.

In this embodiment, as shown in FIGS. 9-10, the middle sleeve 8 is hollow and includes an upper sleeve 81 and a lower sleeve 82, an outer diameter of the lower sleeve 82 is greater than an outer diameter of the upper sleeve 81, the upper sleeve 81 is configured to be inserted into the bulge portion 71, a first sealing groove 83 is formed in a top wall of the upper sleeve 81 and configured to be tightly attached to an upper surface of the first convex ring 72 to achieve the sealing effect, an annular support bulge 84 is further arranged in the upper sleeve 81, a second sealing groove 85 is formed in a top wall of the lower sleeve 82 and configured to mount the gasket 9, a middle sleeve bulge 86 arranged annularly is arranged on an inner wall of a bottom of the lower sleeve 82 and configured to be connected to a bottle mouth, a plurality of grooves 87 are further formed in the bottom of the lower sleeve 82, the lower sleeve 82 is sleeved on the bottle mouth, and the bottom of the lower sleeve 82 is prone to deformation through the arrangement of the grooves 87, which facilitates the lower sleeve 82 to be sleeved on the bottle mouth.

Figure 11:
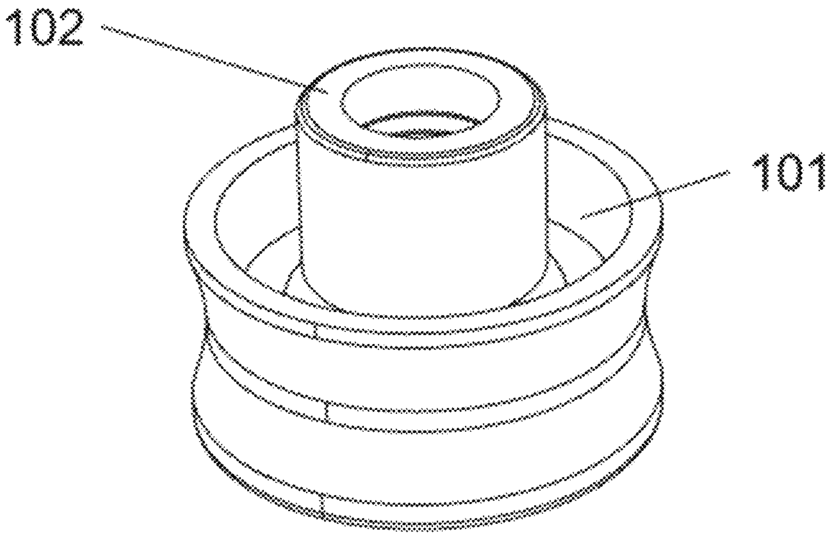
FIG. 11 is a schematic structural diagram of a piston in a short and small external dual-spring sprayer provided by an embodiment of the present application.
Figure 12:
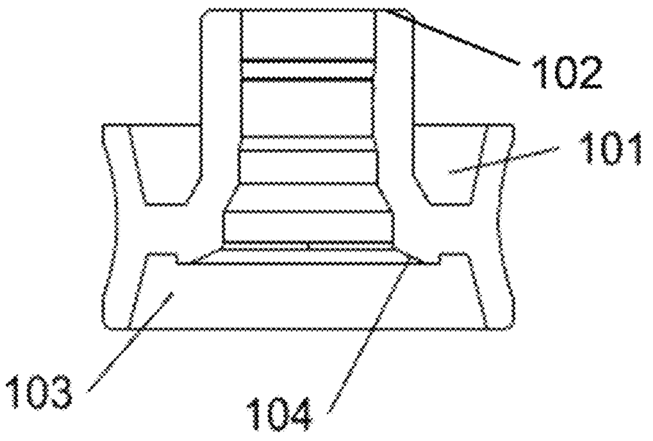
FIG. 12 is a sectional view of a piston in a short and small external dual-spring sprayer provided by an embodiment of the present application.

In this embodiment, as shown in FIGS. 11-12, the piston 10 is hollow, an internal spring lower support region 102 is arranged at an upper end of the piston 10, an annular upper groove 101 is formed in the upper end of the piston 10 and configured to be embedded into the insertion portion 73, a lower groove 103 is formed in a lower end of the piston 10, an annular bevel edge 104 is arranged on an inner wall of the lower groove 103 and configured to match with the valve needle 11 to achieve the sealing effect, the piston 10 is mounted inside the air cylinder 12 and can slide along the air cylinder 12, and the piston 10 and the air cylinder 12 form a cavity structure for accommodating a liquid.

Figure 13:
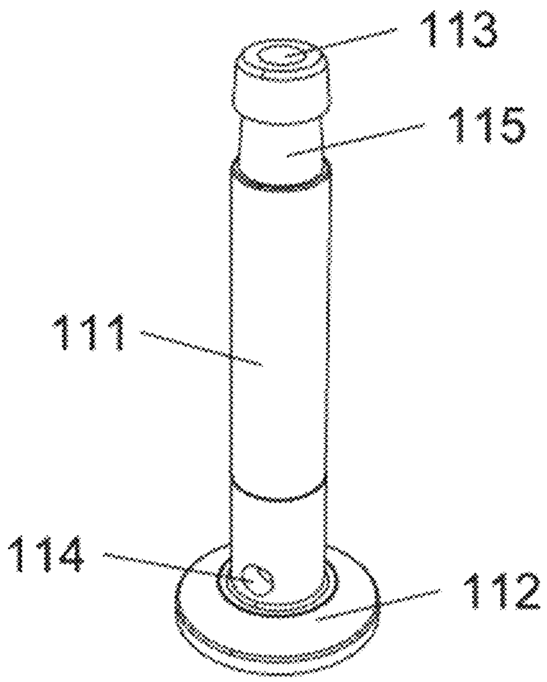
FIG. 13 is a schematic structural diagram of a valve needle in a short and small external dual-spring sprayer provided by an embodiment of the present application.
Figure 14:
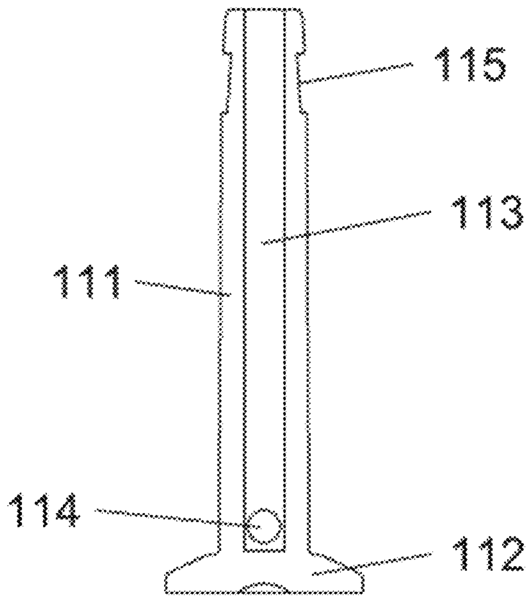
FIG. 14 is a sectional view of a valve needle in a short and small external dual-spring sprayer provided by an embodiment of the present application.

In this embodiment, as shown in FIGS. 13-14, the valve needle 11 includes a needle body 111 and a sealing ring 112, an upper end surface of the sealing ring 112 is an inclined surface, a liquid outlet 113 is formed inside the needle body 111, and a liquid inlet 114 is formed in a bottom of the needle body 111, such that the liquid can enter the liquid inlet 114 and flow out of the liquid outlet 113; an annular groove 115 is formed in an outer wall of an upper part of the needle body 111, and when the upper part of the needle body 111 is inserted into the valve rod 4, the clamping sleeve 44 of the valve rod 4 is embedded into the annular groove 115 to connect the needle body 111 to the valve rod 4; and an inclination angle of the inclined surface of the sealing ring 112 is the same as that of the bevel edge 104, such that the sealing ring 112 can be tightly attached to the bevel edge 104, thereby achieving the sealing effect.

Figure 15:
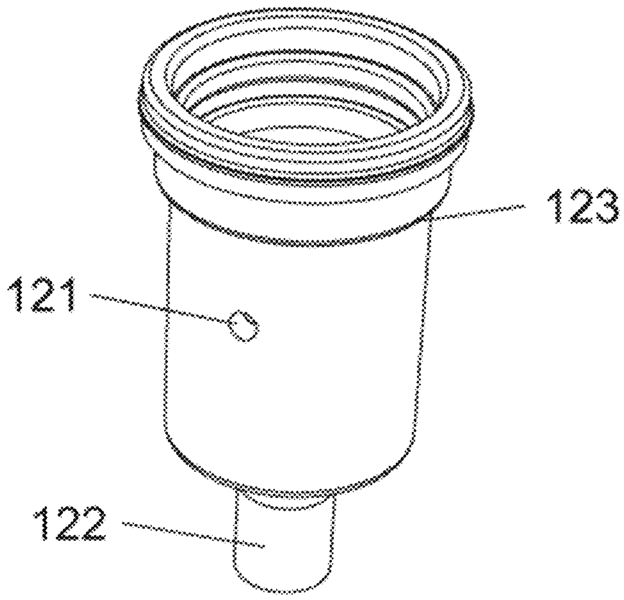
FIG. 15 is a schematic structural diagram of an air cylinder in a short and small external dual-spring sprayer provided by an embodiment of the present application.
Figure 16:
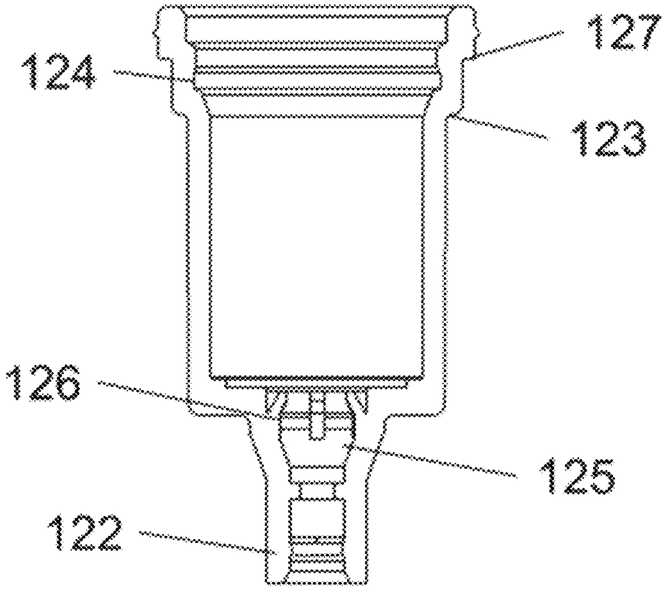
FIG. 16 is a sectional view of an air cylinder in a short and small external dual-spring sprayer provided by an embodiment of the present application.

In this embodiment, as shown in FIGS. 15-16, an air pressure balance hole 121 is formed in an outer wall of the air cylinder 12, a tube connector 122 is arranged at the bottom of the air cylinder 12 and connected to the suction tube 14, an accommodating cavity 125 is formed in a position, located above the tube connector 122, of the air cylinder 12 and configured to place the steel ball 13, and the steel ball 13 can move up and down along the accommodating cavity 125; a plurality of inclined ribs 126 are annularly arranged at an upper part of the accommodating cavity 125, thereby preventing the steel ball 13 from falling off from the accommodating cavity 125; when the steel ball 13 is located at a bottom of the accommodating cavity 125, the tube connector 122 is blocked, and the bottom of the air cylinder 12 is in a sealed state; when the steel ball 13 is separated from the bottom of the accommodating cavity 125 under the action of atmospheric pressure, the liquid enters the accommodating cavity 125 from the suction tube 14 and the tube connector 122, and then flows into the air cylinder 12 from a gap between the steel ball 13 and the accommodating cavity 125; the liquid is stored in the cavity structure formed by the piston 10 and the air cylinder 12, waiting for the next liquid discharge; and further, a second external convex rib 127 is arranged on an outer wall of an upper part of the air cylinder 12, the air cylinder 12 is inserted into the middle sleeve 8 from the bottom up, the second external convex rib 127 is inserted into an upper end of the support bulge 84, the air cylinder 12 is supported by the support bulge 84 to prevent the air cylinder 12 from falling off from the middle sleeve 8, a first external convex rib 123 is arranged at a position, located below the second external convex rib 127, of the outer wall of the upper part of the air cylinder 12 and configured to be attached to an upper surface of the gasket 9 to achieve the sealing effect and prevent the liquid from flowing out of a gap between the middle sleeve 8 and the air cylinder 12, an inner groove 124 is further formed inside the upper part of the air cylinder 12 and configured to be clamped with the second convex ring 74, the bushing 7 is inserted into the air cylinder 12, and the second convex ring 74 is inserted into the inner groove 124 to connect the bushing 7 to the air cylinder 12, thereby preventing the bushing 7 and the air cylinder 12 from being loosened.

A working principle of the present invention is as follows:

During use, the head cap cover 1 is pressed down, the head cap 3 and the spray piece 2 move down, the head cap 3 squeezes down the valve rod 4 and the valve needle 11, the valve rod 4 squeezes down the upper ends of the external spring 5 and the internal spring 6, the lower end of the external spring 5 squeezes the bushing 7 to move down along the middle sleeve 8, and meanwhile, the lower end of the internal spring 6 squeezes the piston 10 to move down along the air cylinder 12 to squeeze the liquid in the cavity structure; in this case, air enters the air cylinder 12 from the air pressure balance hole 121, such that air pressure, located in a space above the piston 10, of the air cylinder 12 is in a balanced state, the steel ball 13 is tightly attached to the bottom of the accommodating cavity 125, the tube connector 122 is in a sealed state, the liquid will not flow out of the tube connector 122, a space of the cavity structure formed by the piston 10 and the air cylinder 12 is gradually reduced, the liquid in the cavity structure flows up and squeezes the piston 10 to move up, the piston 10 and the valve needle 11 move relatively, the upper surface of the sealing ring 112 of the valve needle 11 is separated from the bevel edge 104 of the piston 10, the liquid inlet 114 is exposed, and the liquid flows through the lower groove 103, enters the liquid outlet 113 from the liquid inlet 114, then enters the head cap 3, and is sprayed from the spray piece 2;

The head cap cover 1 is loosened, the valve rod 4, the valve needle 11, and the piston 10 are gradually reset under elastic forces of the external spring 5 and the internal spring 6, and the space of the cavity structure formed by the piston 10 and the air cylinder 12 is gradually expanded to generate negative pressure; and in this case, the steel ball 13 is jacked up under the action of atmospheric pressure, the liquid in the suction tube 14 enters the cavity structure through the gap between the steel ball 13 and the accommodating cavity 125, the external spring 5 and the internal spring 6 are reset, and the valve rod 4, the valve needle 11, and the piston 10 are reset, and the liquid is stored in the cavity structure, waiting for the next liquid discharge.

Apparently, the described embodiments are merely part rather than all of the embodiments of the present invention. All other embodiments obtained by those of ordinary skill in the art and related fields based on the embodiments of the present invention without creative efforts should fall within the scope of protection of the present invention. The structures, apparatuses and methods of operation not specifically described and explained in the present invention are implemented according to conventional means in the art, unless specifically described and limited.

What is claimed is:

1. A short and small external dual-spring sprayer, comprising a head cap cover, wherein a head cap is arranged in the head cap cover, a spray piece is arranged at a front end of the head cap, the head cap is connected to a valve rod, the valve rod is sleeved at an upper part of a valve needle, the valve needle penetrates through a bushing and a piston and is further sleeved with an internal spring, the internal spring has an upper part located in the valve rod and a lower end in contact with the piston, an external spring is arranged on an outer side of the internal spring and has an upper part located in a middle sleeve and a lower part located in the bushing, the middle sleeve is sleeved on an outer side of the bushing and connected to an air cylinder, a gasket is arranged inside the middle sleeve and sleeved on an outer side of the air cylinder, a bottom of the air cylinder is connected to a suction tube, and a steel ball is arranged inside the air cylinder.

2. The short and small external dual-spring sprayer of claim 1, wherein a sleeving hole is formed inside the head cap, and an annular clamping groove is formed in an inner wall of the sleeving hole.

3. The short and small external dual-spring sprayer of claim 1, wherein the valve rod comprises a fixing portion at an upper part and a support portion at a lower part, an outer diameter of the fixing portion is less than an outer diameter of the support portion, a convex rib is arranged on an outer wall of the fixing portion, a clamping sleeve is arranged inside the fixing portion, an annular external spring upper accommodating groove is formed inside the support portion, and an internal spring upper support region is arranged at a position, located on an inner side of the external spring upper accommodating groove, of the valve rod.

4. The short and small external dual-spring sprayer of claim 1, wherein a bulge portion is arranged at an upper part of the bushing, a first convex ring and a second convex ring are arranged in a middle of the bushing, an insertion portion is arranged at a bottom of the bushing, and an external spring lower accommodating groove is formed in an inner wall of the bushing.

5. The short and small external dual-spring sprayer of claim 4, wherein a second external convex rib is arranged on an outer wall of an upper part of the air cylinder, a first external convex rib is arranged at a position, located below the second external convex rib, of the outer wall of the upper part of the air cylinder, and an inner groove is further formed inside the upper part of the air cylinder and configured to be clamped with the second convex ring.

6. The short and small external dual-spring sprayer of claim 1, wherein the middle sleeve comprises an upper sleeve and a lower sleeve, a first sealing groove is formed in a top wall of the upper sleeve, a support bulge is further arranged in the upper sleeve, and a second sealing groove is formed in a top wall of the lower sleeve and configured to mount the gasket.

7. The short and small external dual-spring sprayer of claim 6, wherein a middle sleeve bulge arranged annularly is arranged on an inner wall of a bottom of the lower sleeve, and a plurality of grooves are further formed in the bottom of the lower sleeve.

8. The short and small external dual-spring sprayer of claim 1, wherein an internal spring lower support region is arranged at an upper end of the piston, an annular upper groove is formed in the upper end of the piston, a lower groove is formed in a lower end of the piston, a bevel edge is arranged on an inner wall of the lower groove, the piston is mounted inside the air cylinder, and the piston and the air cylinder form a cavity structure for accommodating a liquid.

9. The short and small external dual-spring sprayer of claim 8, wherein the valve needle comprises a needle body and a sealing ring, an upper end surface of the sealing ring is an inclined surface, a liquid outlet is formed inside the needle body, a liquid inlet is formed in a bottom of the needle body, and an annular groove is formed in an outer wall of an upper part of the needle body.

10. The short and small external dual-spring sprayer of claim 1, wherein an air pressure balance hole is formed in an outer wall of the air cylinder, a tube connector is arranged at the bottom of the air cylinder, an accommodating cavity is formed in a position, located above the tube connector, of the air cylinder and configured to place the steel ball, and a plurality of inclined ribs are annularly arranged at an upper part of the accommodating cavity.

* * * * *